United States Patent [19]
VanderMeer et al.

[11] Patent Number: 5,320,457
[45] Date of Patent: Jun. 14, 1994

[54] DEVICE UTILIZING FLUID FOR EFFECTING NESTED ALIGNMENT OF ARTICLES HAVING A CIRCULAR CROSS-SECTION

[75] Inventors: Richard H. VanderMeer; Donald J. Simkowski, both of Loveland, Colo.

[73] Assignee: Goldco Industries, Inc., Loveland, Colo.

[21] Appl. No.: 999,464

[22] Filed: Dec. 29, 1992

Related U.S. Application Data

[63] Continuation of Ser. No. 733,667, Jul. 22, 1991, abandoned.

[51] Int. Cl.⁵ ............................................. B65G 51/03
[52] U.S. Cl. ...................................................... 406/88
[58] Field of Search ............................... 406/88, 79, 82

[56] References Cited

U.S. PATENT DOCUMENTS

| | | |
|---|---|---|
| Re. 32,684 | 5/1988 | Lenhart . |
| 1,900,781 | 3/1933 | Wardley ........................ 406/82 |
| 2,535,880 | 12/1950 | Tomkins . |
| 3,210,124 | 10/1965 | Niemi et al. .................... 406/88 |
| 3,685,632 | 8/1972 | Brady ............................ 406/88 |
| 3,934,713 | 1/1976 | Vander Meer et al. . |
| 3,982,790 | 9/1976 | Storm et al. ................ 406/88 X |
| 4,500,229 | 2/1985 | Cole et al. . |
| 4,721,419 | 1/1988 | Lenhart . |
| 4,730,955 | 3/1988 | Lenhart . |
| 4,759,673 | 7/1988 | Pearce et al. . |
| 4,828,434 | 5/1989 | Fairman et al. . |
| 4,834,605 | 5/1989 | Jerred . |
| 4,934,508 | 6/1990 | Vander Meer et al. . |

*Primary Examiner*—David M. Mitchell
*Assistant Examiner*—Gary C. Hoge
*Attorney, Agent, or Firm*—Robert E. Harris

[57] ABSTRACT

A device is disclosed that utilizes a fluid (normally air) to effect nested alignment of articles having a circular cross-section (such as cans used to package beverages and the like). A conveying section that includes a dead plate and a fluid conveyor provides articles in a mass flow to an aligning section having guides therein spaced a sufficient distance to form guideways through which articles are fluid driven in single file toward a discharge end having an adjacently positioned staging section that also includes a fluid conveyor. The guides, other than a center guide, have first and second portions that are angled with respect to one another, and fluid injected into the sections through apertures in a base plate providing section bottoms urges the articles into a plurality of adjacent rows of aligned articles at the staging section with the articles of each adjacent row offset from one another to effect nesting of the articles. Readily removable section top units preclude upward movement of the articles, and nested and aligned articles discharged from the staging area are provided to a palletizer or like apparatus.

29 Claims, 5 Drawing Sheets

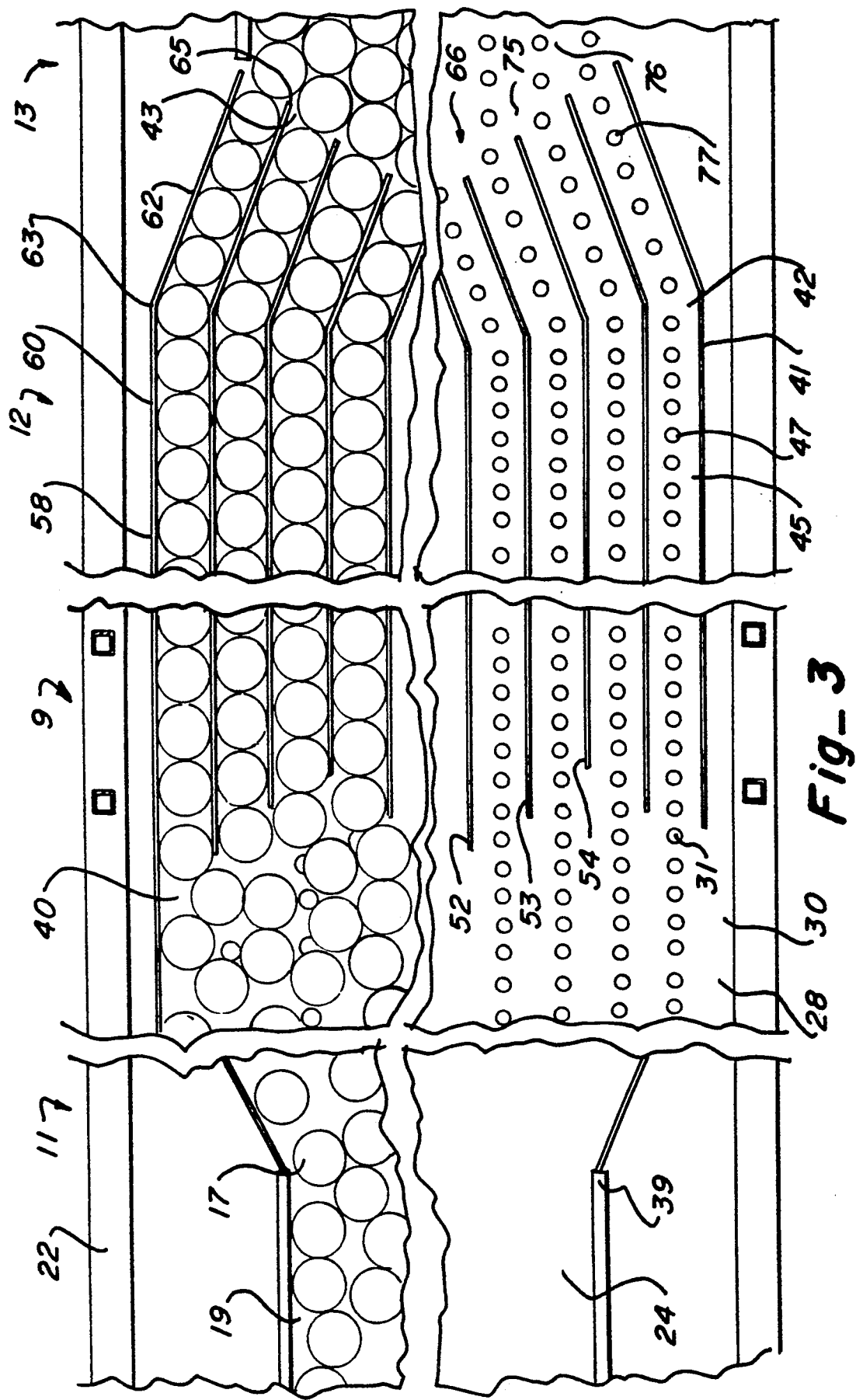

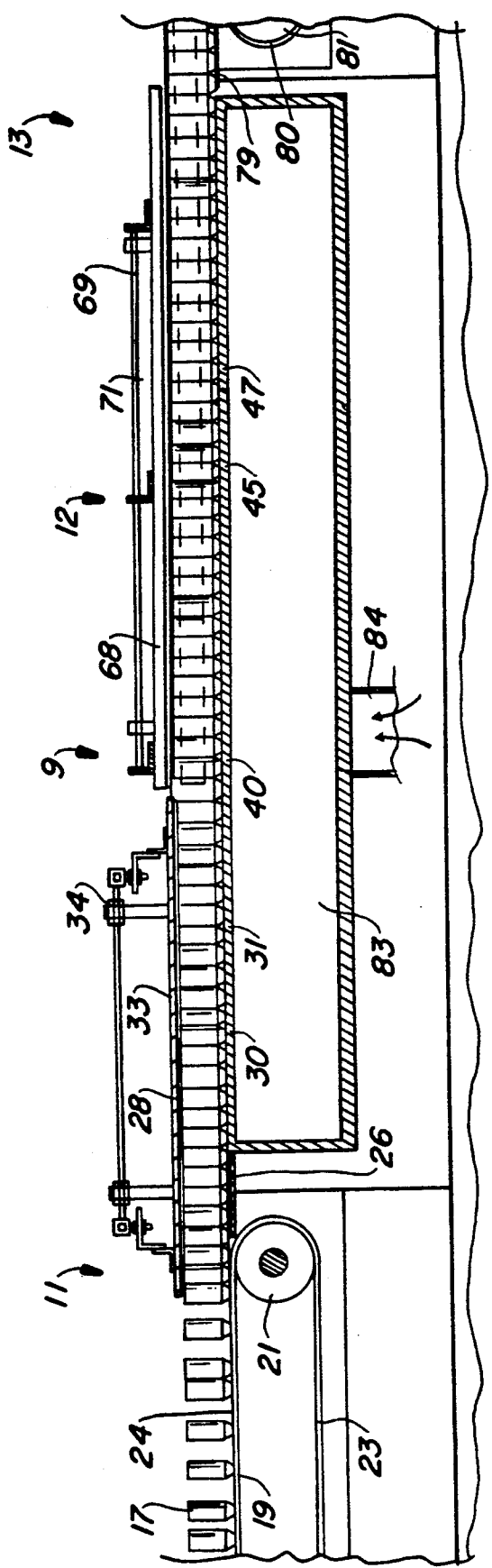
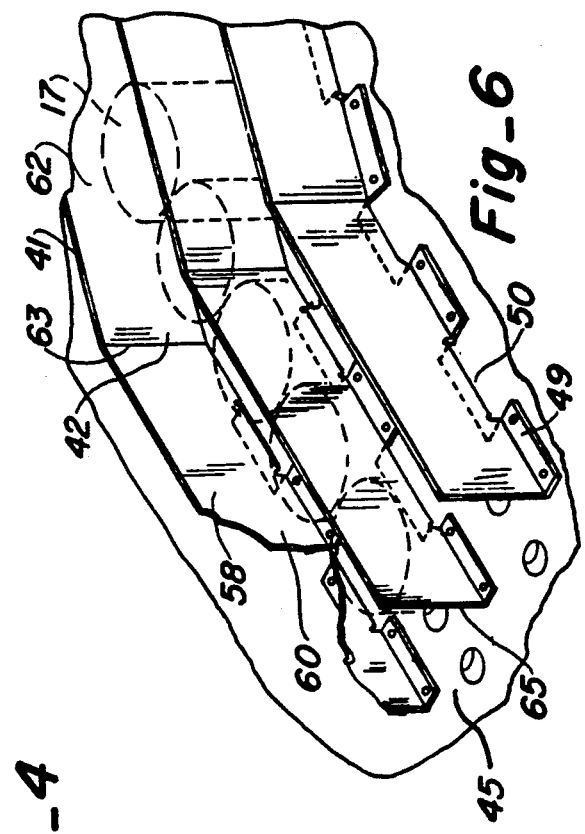
Fig.-6
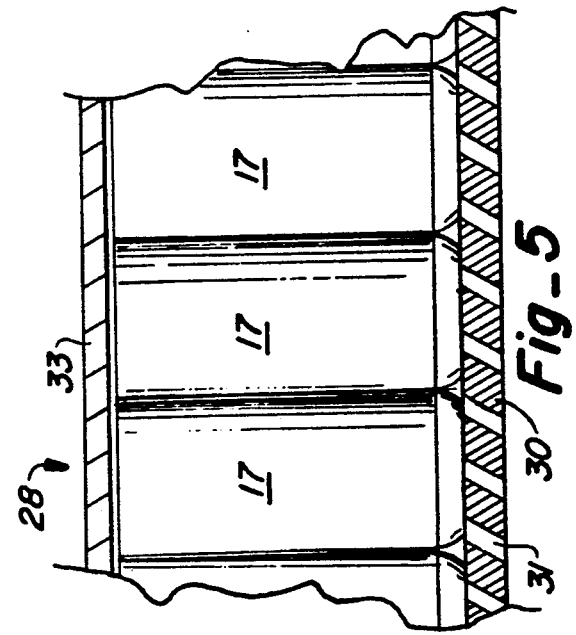
Fig.-5
Fig.-4

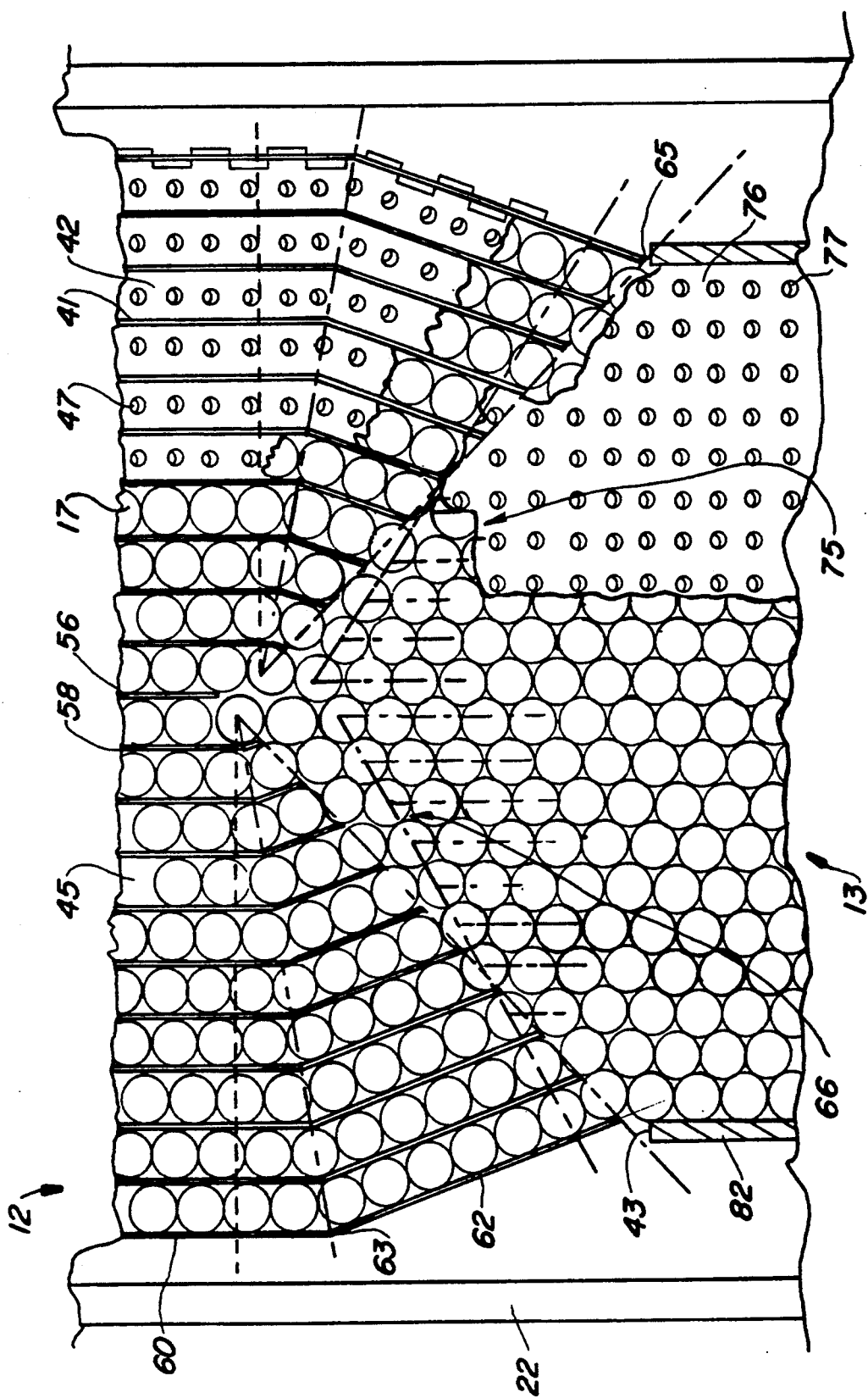
Fig_7

1

DEVICE UTILIZING FLUID FOR EFFECTING NESTED ALIGNMENT OF ARTICLES HAVING A CIRCULAR CROSS-SECTION

RELATED APPLICATION

This application is a continuation of U.S. Pat. application Ser. No. 07/733,667, filed Jul. 22, 1991, which is now abandoned.

FIELD OF THE INVENTION

This invention relates to a device for effecting nested alignment of articles having a substantially, or generally, circular cross-section, and, more particularly, relates to such a device utilizing fluid (normally air) to urge the articles into the nested and aligned relationship.

BACKGROUND OF THE INVENTION

It is oftentimes necessary to arrange articles in a predetermined pattern in order to effect a desired end. Such is the case, for example, where it is desired that the articles be in single file (for enabling filling of the articles, for example, where the articles are beverage cans) or be in a plurality of adjacent rows (for storing the articles, for example, on a pallet or the like).

Apparatus utilizing air conveyors for causing articles (cans), conveyed to the apparatus in a mass flow, to be arranged into single file is shown, for example, in U.S. Pat. No. 4,500,229 and U.S. Reissue Pat. No. RE. 32,684, while apparatus utilizing mechanical conveyors for arranging articles (cans) into a plurality of nested and aligned rows is shown, for example, in U.S. Pat. Nos. 4,834,605 and 2,535,880.

It is now also known that article-size unoccupied spaced in a nested and aligned arrangement of articles, such as cans, can be eliminated by utilization of movable side walls at opposite sides of the rows of articles (see, for example, U.S. Pat. No. 4,934,508).

The use of air has not only been heretofore suggested to urge articles, such as cans, to be arranged in single file (as brought out above), but has also been heretofore suggested for use in urging movement of articles, such as cans, along a surface in a mass flow (see, for example, U.S. Pat. No. 4,828,434). Such arrangements utilizing fluid have not, however, been heretofore used to effect nested alignment of articles.

SUMMARY OF THE INVENTION

This invention provides a device that utilizes a fluid (normally air) to effect nested alignment of articles having a substantially, or generally, circular cross-section.

A conveying section, preferably including a dead plate having fluid and mechanical conveying portions at opposite sides thereof, provides articles in a mass flow to an aligning section having a plurality of guides, or partitions, through which articles are fluid driven to a staging section, preferably including fluid and mechanical conveying portions, where the articles are formed into a plurality of adjacent rows of nested and aligned articles. Fluid is injected into the sections through apertures in bottom plates at each section and readily removable top units are provided at each section. The nested and aligned articles are discharged from the device, normally to a palletizer or the like.

It is an object of this invention to provide an improved device for effecting nested alignment of articles having a generally circular cross-section.

It is another object of this invention to provide an improved device that utilizes fluid for effecting nested alignment of articles having a generally circular cross-section.

It is still another object of this invention to provide an article nesting and aligning device that includes conveying, aligning and staging sections each providing fluid drive for urging articles through the sections.

It is still another object of this invention to provide an improved article nesting and aligning device that includes a receiving section that includes a dead plate with fluid and mechanical conveyors at opposite sides thereof.

It is still another object of this invention to provide an improved article nesting and aligning device that includes an aligning section with a plurality of guides forming guideways and an apertured base plate for injection of fluid into the guideways to urge articles through the guideways to a staging section having a fluid conveyor to urge the articles into adjacent nested rows.

It is yet another object of this invention to provide an improved articles nesting and aligning device utilizing fluid and having readily removable top units.

It is yet another object of this invention to provide an improved fluid driven article nesting and aligning device used in connection with a palletizer to effect palletizing of nested and aligned articles.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 3 is a top view of the device of this invention with a reduced number of passageways illustrated and with the top units removed;

FIG. 4 is a cross-sectional side view of the device of this invention shown in FIG. 1 and 2;

FIG. 5 is a partial cross-sectional side view of the air conveyor section illustrating positioning of the base plate and top unit relative to articles passing therebetween;

FIG. 6 is a partial perspective view of the guides, or partitions, utilized in the aligning section; and FIG. 7 is a top view with portions broken away and particularly illustrating the aligning section (including positioning of the partitions therein) and the staging section.

DESCRIPTION OF THE INVENTION

Device 9 of this invention is shown in FIGS. 1 through 4 to include a receiving section 11 providing a receiving area, an aligning section 12 providing an aligning area, and a staging section 13 providing a staging area, with aligning section 12 being downstream with respect to the direction of article movement from receiving section 11, and with staging section 13 being downstream from aligning section 12 with respect to the direction of article movement.

Figure 1:
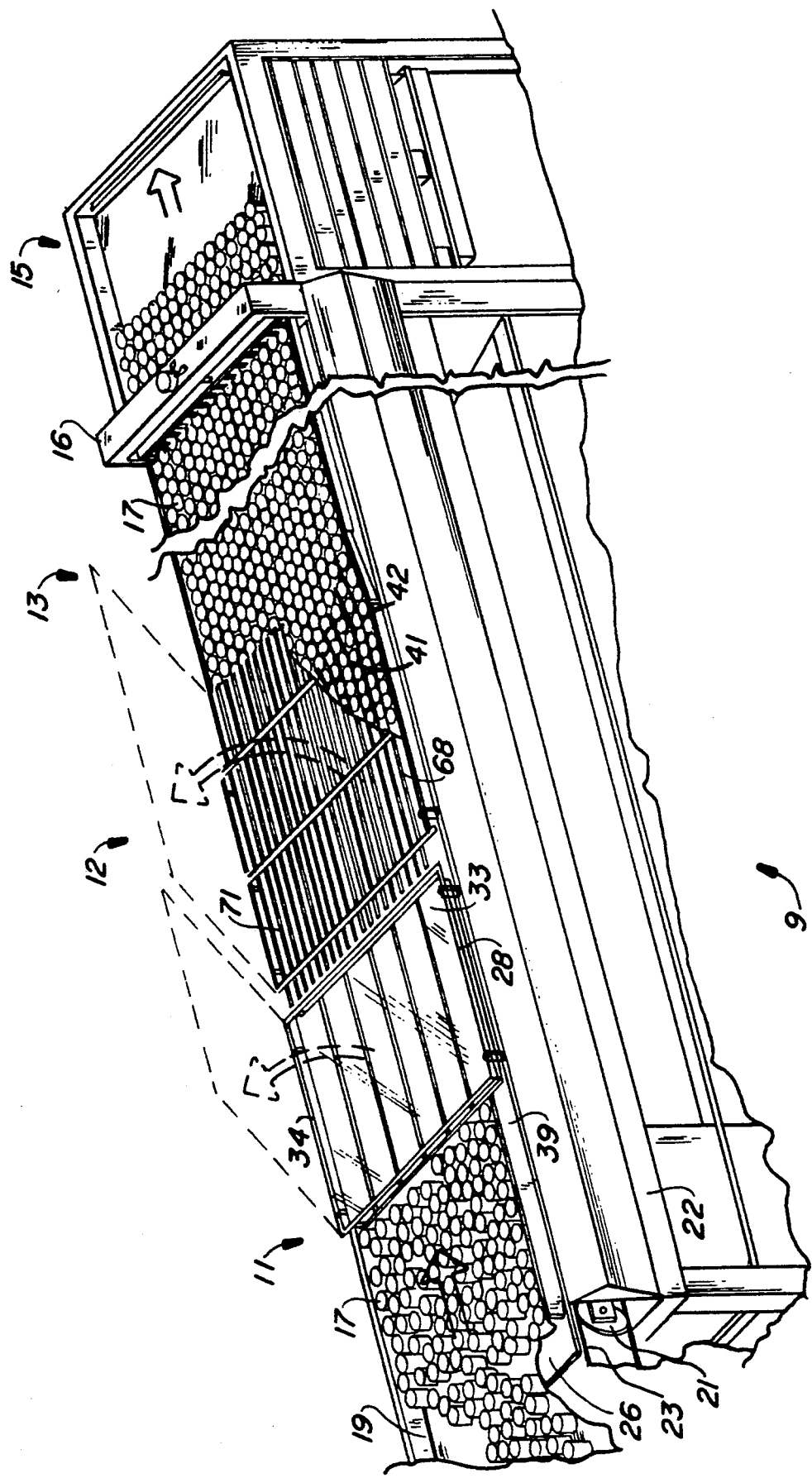
FIG. 1 is a perspective view of the device of the invention utilized in conjunction with a palletizer.

As also shown in FIG. 1, a palletizer 15 may be positioned adjacent to, and downstream from, staging section 13, and a stop mechanism 16 is provided to control movement of articles to the palletizer, as is conventional.

Articles 17 having a substantially, or generally, circular cross-section (such as, for example, metal cans to be filled with a beverage or the like), to be arranged in nested and aligned relationship with one another, are received at receiving section 11, and, more particularly, at conveying portion 19.

Figure 2:
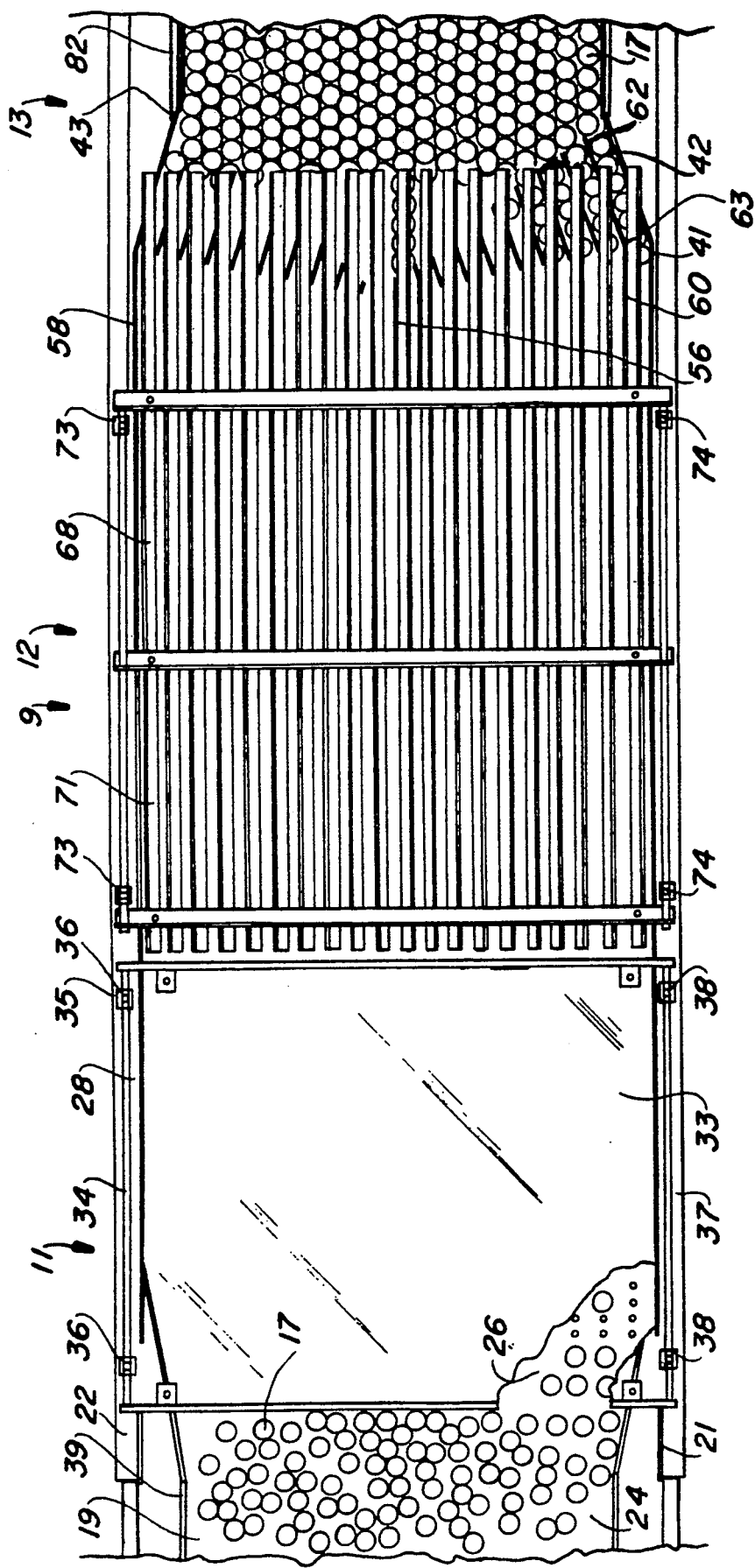
FIG. 2 is a top view of the device of this invention as shown in FIG. 1.

Conveying portion 19 may be conventional and may be, for example, a mechanical conveyor having rollers 21 rotatably mounted on support structure (generally identified by the numeral 22) with endless belt 23 carried by the rollers, one or more of which rollers is conventionally driven to cause movement of the substantially horizontally extending top surface 24 in the direction of primary intended movement of articles. Top surface 24 contacts the bottoms of received articles 17 to convey the received articles in mass toward dead plate 26 (as shown in FIGS. 1, 2 and 4) which also is a part of receiving section 11.

As shown, dead plate 26 is a substantially horizontally positioned metallic plate about twelve to sixteen inches in length (in the downstream direction) and extending entirely across the width of the device, with the dead plate being connected to supporting structure 22 at the opposite edges of the device. Dead plate 26 receives articles thereon as the articles are discharged from conveyor portion 19, with the articles being caused to slide across the dead plate due to pressure exerted by additional articles discharged from conveyor portion 19. After sliding across the dead plate, the articles are discharged onto air conveyor portion 28 which is also a part of receiving section 11.

As indicated in FIGS. 3 through 5, air conveyor portion 28 includes substantially horizontally extending base plate 30 having apertures 31 formed therein. Apertures 31 are slanted so that air is injected therethrough in a downstream direction to thus urge articles in the downstream direction (i.e., away from the dead plate). While the apertures may be drilled at a slant in the base plate, the base plate with apertures therein may also be formed as shown and described in U.S. Pat. No. 4,828,434.

A solid top cover 33 is provided above dead plate 26 (preferably above the entire dead plate but at least over a portion thereof) and base plate 30. As is illustrated in FIG. 4 and 5, top cover 33 is positioned above dead plate 26 and base plate 30 a distance slightly greater than the height of the articles to pass therebetween to thereby prevent the articles from tipping.

Top cover 33 may have ancillary structure 34 (as best shown in FIG. 4) connected therewith, is preferably connected to one side 35 of supporting structure 22 by means of hinges 36 (as shown in FIG. 2), and is releasably fastened at the other side 37 of the supporting structure by means of conventional releasable fasteners 38. When so connected, top cover 33 is positioned above and parallel to dead plate 26 and base plate 30 when fastened in operating position and may be rotated about hinges 36 to facilitate ready removal when fasteners 38 are released (as is illustrated in FIG. 1).

As indicated in FIGS. 1, 2 and 3, side plates (or rods) 39 are provided at (or near) each side of receiving section 11 to maintain the articles on the top surface 24 of belt 23, on dead plate 26, and on (or above with air injected) the top surface of base plate 30.

The articles are discharged in a mass flow from discharge end 40 of receiving section 11 into aligning section 12 where the articles are formed into a plurality of rows by guides, or partitions, 41 forming a plurality of guideways, or passageways, 42, after which the articles are discharged from discharge end 43 of aligning section 12 by rows into staging section 13. At the staging section, the rows discharged from guideways 42 are brought into adjacent positions with the articles of each row offset from one another so that the articles are thereafter in a nested relationship with the adjacent articles of each row in contact with one another and the articles of adjacent rows also in contact with one another with no article-size unoccupied spaces existing between adjacent articles.

Aligning section 12 includes substantially horizontally extending base plate 45 having apertures 47 therein. As indicated, apertures 47 are slanted in the direction of guideways 42 (formed between guides 41) so that fluid (normally air) injected therethrough urges articles through the guideways. As indicated in FIGS. 3 and 7, apertures 47 are preferably centered in the base plate between adjacent guides. The apertures may be drilled in the base plate at a slant, but may also be formed as shown and described in U.S. Pat. No. 4,828,434.

As best shown in FIG. 6, the plurality of substantially vertically extending guides, or partitions, 41 are positioned, and preferably conventionally attached, at oppositely directed bottom edges, or flanges, 49 and 50, to base plate 45. As also shown in FIG. 6, each partition 41 preferably has a height less than the height of articles to pass through aligning section 12 (by about one inch or more, for example), and each partition preferably has notches (not shown) therein at the bottom edge.

Partitions 41 extend upwardly from base plate 45 parallel to one another and are spaced a sufficient distance to allow articles to pass in single file in an upright position through passageways, or guideways, 42 established between adjacent partitions. Thus, for cans to be filled with a beverage (for example cans for packaging twelve ounces of the beverage), the cans are upright with the circular cross-section parallel to the base plate when passing through the guideways.

As shown in FIG. 3, partitions 41 are arranged so that each successive partition extends into receiving section 11 a different distance (or not at all) to facilitate loading of articles into the guideways. As shown, partitions 41 are thus grouped into alternate first, second and third groups 52, 53, and 54, with the partitions of first group 52 extending into receiving section 11 a distance about twice as far as do the partitions of second group 53, while the partitions of third group 54 do not extend into the receiving section.

Center partition 56 (i.e., partition 41 that is centrally partitioned) extends in a direction parallel to the primary intended direction of movement of articles in passing downstream through aligning section 12 (as best shown in FIGS. 2 and 7). The remainder 58 of the partitions (i.e., the non-centrally positioned partitions 41) have a leading portion 60 (a major portion) that extends parallel to central partition 56 (with each partition spaced from each adjacent partition by a distance slightly greater than the diameter of articles to pass through the guideways, as brought out above).

Each partition 58 also has a more downstream portion 62 that extends from junction 63 (i.e., the junction established between portions 60 and 62 of each partition 58) through aligning section 12 in a generally downstream direction but at an angle with respect to the direction of primary intended movement of articles downstream through the device, with portions 60 and 62 of each partition 58 forming an acute angle at junction 63, which angle is preferably about 20° with respect to the direction of primary intended movement (and hence preferably about 160° with respect to portions 60 and 62).

As can be best seen from FIG. 7, junctions 63 of partitions 58 fall along a plane that extends at an acute angle with respect to the downstream extension of the plane formed by central partition 56 (and hence at an angle from the primary intended downstream direction of movement of articles) at an angle of about 80°.

Portions 62 of partitions 58 extend a distance greater than does central partition 56 and each successive outwardly spaced portion 62 of partition 58 progressively terminates at free end 65 positioned at a greater distance downstream, with the free ends 65 of the partitions terminating in a plane that extends at an acute angle of about 45° in each direction with respect to the downstream extension of the plate formed by central partition 56 so that the free ends of the partitions form a discharge end 43 of aligning section 12 having a V-shape (therefore, staging section 13 may also be considered to have a V-shape input end 66 as best shown in FIGS. 3 and 7).

As shown in FIG. 7, partitions 58 extending in one direction (relative to the width of the aligning section) from central partition 56 have junctions 63 that are offset in the downstream direction one-half of the total diameter of the article with respect to partitions 58 extending the opposite direction so that rows of articles discharged from the guideways at opposite sides of center partition 56 are offset from one another by one-half of the distance of the articles when discharged into staging section 13. The number of partitions utilized depends upon the number of rows of articles needed. When used with a palletizer, for example, twenty rows are utilized with twenty-one cans in each row.

A top unit 68 with ancillary structure 69 (as shown in FIG. 4) also has a plurality of uniformly spaced L-shaped bars 71 extending lengthwise (i.e., in the downstream direction of article movement) parallel to and spaced from one another with one leg of each bar extending across the top of each guideway 42. Top unit 68 is fastened to side 35 of supporting structure 22 by means of hinges 73 and fastened to the other side 37 of the supporting structure by means of readily releasable fasteners 74. When in operating position above and parallel to base plate 45, the bottom surface (provided by bars 71) of top unit 68 is slightly above the top portion of articles to pass through the guideways of the aligning section (top unit 68 is about one inch from the top edges of partitions 41).

Staging section 13 has an air conveyor portion 75 (including the V-shape input end 66) that includes base plate 76 with apertures 77 therein slanted in the downstream direction. Again, apertures 77 may be drilled at a slant, but may also be formed as shown in U.S. Pat. No. 4,828,434. As indicated in FIG. 2, top unit 68 also preferably covers the portion of staging area 13 having base plate 76 (base plate 76 may be an extension of base plate 45 of aligning section 12).

As also shown in FIG. 4, staging section 13 preferably also includes conventional mechanical conveyor 79 positioned downstream from and adjacent to base plate 76 to receive articles discharged from air conveyor portion 75 of the staging section. Conveyor 79 can be conventionally implemented by endless belt 80 carried around rollers 81 (one or more of which may be conventionally driven) to receive the nested and aligned articles from the air conveyor portion 75 and convey the articles to a utilization unit such as palletizer 15 (in a manner as shown, for example, in U.S. Pat. No. 4,759,673). Side walls, or rods, 82 are provided at (or near) the sides of staging area 13 to maintain the articles on (or above with air injected) base plate 76 and belt 80. As is conventional, conveyor 79 may be of sufficient length to convey sufficient articles to fill one or more pallets and stop mechanism 16 (such as shown, for example, in U.S. Pat. No. 3,934,713) allows only enough articles to pass each time to fill a pallet.

Plenum, or chamber, 83 (shown in FIG. 4) is formed below the base plates (which, of course, could be implemented as a common base plate) to supply fluid (normally air), under pressure, through the apertures in the base plates. While not specifically shown, it is to be realized that plenum 83 is supplied with fluid from an external source, such as, for example a conventional blower through conduit 84.

In operation, articles supplied to receiving section 11 (which articles may, for example, be conveyed to the receiving section from a can decorating unit) are conveyed in a mass flow through the receiving section and discharged therefrom into the aligning section where the articles are automatically separated and urged in single file through the guideways. The articles are discharged from the guideways into the staging area where the articles are automatically brought into adjacent aligned rows with the aligned rows being in offset adjacent relationship so that the articles in each row are brought into nested relationship with each article in contact with adjacent articles in the row and also in contact with adjacent articles in adjacent rows with substantially no can-size unoccupied spaces between adjacent articles. The thus nested and aligned articles are then conveyed in the downstream direction from the device.

In view of the foregoing, it is to be appreciated that this invention provides an improved device utilizing fluid for effecting nested alignment of articles having a substantially circular cross-section.

What is claimed is:

1. A device for effecting nested alignment of articles having a generally circular cross-section, said device comprising:

conveying means for receiving articles having a generally circular cross-section and providing said articles at a discharge end;

first top means positioned slightly above articles when at said conveying means so that when so positioned said first top means is contactable by the top portion of said articles as said articles move through said conveying means below said first top means;

aligning means adjacent to said discharge end of said conveying means for receiving articles discharged in a downstream direction from said conveying means, said aligning means including a base plate having first and second groups of apertures therein, and guide means at said base plate for establishing a plurality of guideways each of which has sufficient width to enable articles to move through said guideways in single file, said plurality of guideways having a first portion extending substantially parallel to the primary intended path of travel of articles in passing through said aligning means with at least some of said guideways having a second portion extending at an angle with respect to said first portion, said first group of apertures being positioned in said base plate to open into said first portions of said guideways and said second group of apertures being positioned in said base plate to open into said second portions of said guideways;

second top means separate from and positioned downstream from said first top means, said second top means having a configuration such that fluid passage therethrough is dissimilar to that of said first top means with said second top means being positioned slightly above articles when at said aligning means so that when so positioned said second top means is contactable by the top portion of said articles as said articles move through said aligning means below said second top means;

staging means for receiving articles discharged in a downstream direction from said guideways of said aligning means; and fluid inserting means for inserting fluid into said guideways through said apertured base plate with said fluid being directed into said first portions of said guideways in a direction substantially parallel to said first portions of said guideways to urge movement of said articles through said first portions of said guideways in the direction of primary intended travel of articles in passing through said aligning means and with said fluid also being directed into said second portions of said guideways in a direction substantially parallel to said second portions of said guideways to urge movement of said articles through said second portions of said guideways in a direction different than said direction of primary intended travel of articles in passing through said aligning means to thereby urge movement of articles through said guideways and into said staging means with the articles discharged from said guideways providing a plurality of separate adjacent rows of articles at said staging means and with the articles of said adjacent rows being offset from one another such that the articles are in nested relationship with each article contacting adjacent articles in the same and adjacent rows.

2. The device of claim 1 wherein a first portion of said conveying means includes a dead plate for receiving said articles thereon, and wherein a second portion of said conveying means includes a fluid conveyor adjacent to said dead plate for receiving articles therefrom, said fluid conveyor having fluid injecting means for causing articles received from said dead plate to be urged in a mass flow toward said discharge end of said conveying means.

3. The device of claim 1 wherein said conveying means includes a fluid conveyor having a base plate positioned to be contactable by the bottom portion of articles at said conveying means with said base plate having apertures therein through which fluid is injected in a direction to urge articles toward said discharge end of said conveying means.

4. The device of claim 1 wherein at least one of said first and second top means is readily removable.

5. The device of claim 1 wherein said base plate of said aligning means has said guide means mounted thereon.

6. The device of claim 5 wherein said guide means includes a plurality of spaced walls each of which extends upwardly from said base plate.

7. The device of claim 1 wherein said second top means is positioned over and adjacent to said guide means.

8. The device of claim 7 wherein said second top means includes a plurality of spaced bars.

9. The device of claim 7 wherein said second top means is readily removable.

10. The device of claim 1 wherein said staging means includes a base plate contactable with the bottom portion of said articles, said base plate having apertures therein through which fluid is injected in a direction to urge movement of articles through said staging means.

11. The device of claim 10 wherein said staging means also includes additional conveying means adjacent to said base plate for conveying aligned and nested articles received from said base plate toward a discharge end of said staging means.

12. The device of claim 1 wherein said device is adapted to convey articles toward palletizing means positioned for receiving articles discharged from said staging means.

13. The device of claim 12 wherein said device has stop means positionable between said palletizing means and said staging means for controlling movement of said aligned and nested articles from said staging means toward said palletizing means.

14. A device for effecting nested alignment of articles having a generally circular cross-section, said device comprising:

conveying means for receiving articles having a generally circular cross-section and providing said articles at a discharge end, said conveying means including a fluid conveyor having a base plate positioned to be contactable by the bottom portion of articles at said conveying means with said base plate having apertures therein through which fluid is injected in a direction to urge articles toward said discharge end of said conveying means, said fluid conveyor also having a substantially solid top plate positioned slightly above articles when at said conveying means so that when so positioned said top plate is contactable by the top portion of said articles when said articles move through said conveying means, said top plate of said fluid conveyor being readily removable, said top plate including hinge means at one side of said top plate for allowing said top plate to be rotated about said hinge means to facilitate removal of said top plate from said position contactable by the top portion of said articles when said articles pass through said conveying means;

aligning means adjacent to said discharge end of said conveying means for receiving articles discharged from said conveying means, said aligning means including an apertured base plate and guide means at said base plate for establishing a plurality of guideways each of which has sufficient width to enable articles to move through said guideways in single file;

staging means for receiving articles discharged from said guideways of said aligning means; and fluid inserting means for inserting fluid into said conveying means and said guideways through said apertured base plate to urge movement of articles through said conveying means and said guideways and into said staging means with the articles discharged from said guideways providing a plurality of separate adjacent rows of articles at said staging means and with the articles of said adjacent rows being offset from one another such that the articles are in nested relationship with each article contacting adjacent articles in the same and adjacent rows.

15. The device of claim 14 wherein said top plate has releasable fastening means at the side of said top plate opposite to said one side having said hinge means thereat.

16. A device for effecting nested alignment of articles having a generally circular cross-section, said device comprising:

conveying means for receiving articles having a generally circular cross-section and providing said articles at a discharge end;

aligning means adjacent to said discharge end of said conveying means for receiving articles discharged from said conveying means, said aligning means including an apertured base plate and guide means at said base plate for establishing a plurality of guideways each of which has sufficient width to enable articles to move through said guideways in single file aid said aligning means also including a readily removable top unit positioned over and adjacent to said guide means, said top unit of said aligning means including hinge means at one side of said top unit for allowing said top unit to be rotated about said hinge means to facilitate removal of said top plate from a position over and adjacent to said guide means;

staging means for receiving articles discharged from said guideways of said aligning means; and fluid inserting means for inserting fluid into said guideways through said apertured base plate to urge movement of articles through said guideways and into said staging means with the articles discharged from said guideways providing a plurality of separate adjacent rows of articles at said staging means and with the articles of said adjacent rows being offset from one another such that the articles are in nested relationship with each article contacting adjacent articles in the same and adjacent rows.

17. The device of claim 16 wherein said top unit has releasable fastening means at the side of said top unit opposite to said one side having said hinge means thereat.

18. A device for effecting nested alignment of articles having a generally circular cross-section, said device comprising:

conveying means for receiving articles having a generally circular cross-section, said conveying means having a discharge end and including an apertured base plate;

first top means including a substantially solid top plate positioned slightly above articles when at said conveying means so that when so positioned said top plate is contactable by the top portion of said articles when said articles move through said conveying means;

aligning means adjacent to said discharge end of said conveying means for receiving articles discharged from said conveying means, said aligning means having an apertured base plate and a plurality of partitioning walls extending upwardly adjacent to said base plate of said aligning means, said partitioning walls being spaced from one another a distance sufficient to form a plurality of passageways between adjacent ones of said walls and through which articles move in single file, said passageways terminating at discharge ends that are spaced from one another;

second top means including a bar top formed by a plurality of spaced bars extending along said base plate substantially parallel to and spaced from one another, said bar top being positioned slightly above articles when at said aligning means so that when so positioned said bar top is contactable by the top portion of said articles when said articles move through said aligning means, and said partitioning walls being mounted on one of said base plate of said aligning means and said second top means;

staging means for receiving articles discharged from the discharge ends of said passageways; and article urging means including air supplying means to inject air into at least said conveying means and said aligning means through said apertured base plates, said article urging means causing movement of articles through said conveying means toward said discharge end, causing movement of articles through said passageways, and causing movement of articles toward said staging means to form a plurality of adjacent rows of articles with the articles of the adjacent rows being offset from one another such that the articles are in nested relationship with each article contacting adjacent articles in the same and adjacent rows.

19. The device of claim 18 wherein said conveying means includes first, second and third portions, with said second portion being a dead plate positioned between said first and third portions and said third portion being an air conveyor adapted to receive said air injected by said air supplying means.

20. The device of claim 18 wherein said passageways formed by said plurality of partitioning walls have a first portion extending substantially parallel to a primary intended path of travel of articles in passing through said aligning means with at least a part of said passageways having a second portion extending at an angle with respect to said first portion, wherein said apertured base plate of said aligning means has apertures between each of said first and second portions of said partitioning walls, and wherein said air supplying means injects air into said first portions of said passageways of said aligning means through said apertures in a direction substantially parallel to said first portions of said passageways to urge articles through said first portions of said passageways in a direction substantially parallel to said direction of primary intended path of travel of articles in passing through said aligning means, and injects air into said second portions of said passageways through said apertures in a direction substantially parallel to said second portions of said passageways to urge articles through said second portions of said passageways in an angled direction with respect to the direction of air injected into said first portions of said passageways.

21. The device of claim 18 wherein said plurality of partitioning walls each have a major portion extending along said base plate parallel to and spaced from one another.

22. The device of claim 21 wherein one of said partitioning walls is a straight wall that extends substantially parallel to the direction of movement of articles when in nested relationship with one another, and wherein the remainder of said plurality of partitioning walls have a first portion parallel to said one partitioning wall and a second portion extending at an angle from a junction with said first portion, said angle being substantially the same for each of said remainder of said plurality of partitioning walls.

23. The device of claim 22 wherein said angle formed by each of said first and second partitioning walls is substantially 160° with respect to one another.

24. The device of claim 22 wherein said junctions of said first and second portions of said partitioning walls are progressively spaced from each side of said one partitioning wall and progressively terminate at different positions with respect to the direction of movement of articles when in nested relationship, said junctions being along a plane that extends at an angle of substantially 80° with respect to the direction of article movement when in nested relationship, and said termination of each of said second portions being along a plane that extends at an angle of substantially 45° with respect to the direction of article movement when in nested relationship.

25. The device of claim 18 wherein preselected partitioning walls of said aligning means extend into the conveying area established by said air conveying means.

26. The device of claim 25 wherein said preselected partitioning walls include first and second groups with said first group extending into said conveying area a distance greater than does said second group.

27. A device for effecting nested alignment of cans having a generally circular cross-section, said device comprising:
conveying means having a first section for receiving cans having a generally circular cross-section, a second section that includes a dead plate for receiving cans from said first section, and a third section for receiving cans from said dead plate and conveying said cans toward a discharge end, said third section of said conveying means including a base plate having apertures formed therein;
first top means including a substantially solid top wall positioned above said dead plate and said base plate of said conveying means and positioned slightly above articles when at said conveying means so that when so positioned said top wall of said first top means is contactable by the top portion of said cans when said cans move through said conveying means;
aligning means including a base plate adjacent to said third section of said conveying means for receiving cans discharged from said conveying means, said base plate of said aligning means having apertures formed therein, and said aligning means also having a plurality of partitioning walls mounted on and extending upwardly from said base plate of said aligning means a distance slightly greater than the height of cans received at said conveying means, said plurality of partitioning walls including a first wall that is centrally positioned and extending in a predetermined direction that is substantially parallel to the direction of primary intended movement of said cans through said device and second walls spaced progressively outwardly from said first wall such that said cans can move between adjacent ones of said partitioning walls in single file, said second walls having a first portion parallel to said center wall and a second portion extending from said first portion at an angle of substantially 160° with the junction between said first and second portions being along a plane that extends at an angle of substantially 80° with respect to said direction of primary intended movement of said cans, and said second portions of said second walls terminating along a plane that is at an angle of substantially 45° with respect to said direction of primary intended movement of said cans;
staging means formed at least in part by a base plate having apertures formed therein, said staging means receiving cans discharged from said aligning means;
second top wall means including a plurality of uniformly spaced bars extending substantially parallel to one another in said direction of primary intended movement of said cans, said second top wall means being positioned above said base plates of said aligning means and said staging means and engaging said partitioning walls of said aligning means so that when so positioned said bars of said second top wall means are contactable by the top portion of said cans when said cans move below said second top wall means; and
an air reservoir positioned below said base plate of said connecting means, said aligning means, and said staging means and supplying air through said apertures in said base plates to cause can movement so that said cans pass between said partitioning walls and form adjacent rows of cans at said staging means with the cans of adjacent rows being offset from one another such that the cans are in nested relationship with each can contacting adjacent articles in the same and adjacent rows such that no can-size spaces are left therebetween.

28. The device of claim 27 wherein said staging means also includes additional conveying means for receiving cans from said base plate of said staging means and conveying said cans to a discharge end of said device in nested and aligned relationship.

29. The device of claim 27 wherein said first and second top means each includes hinge means at one side and fastening means at the side opposite to said one side so that said top means can be rotated about said hinge means so that said top means is readily removable from a position over cans being conveyed through said device.

* * * * *